No. 627,876. Patented June 27, 1899.
J. PRICE.
CLUTCH.
(Application filed Feb. 20, 1899.)
(No Model.)

UNITED STATES PATENT OFFICE.

JAMES PRICE, OF MAIDSTONE, ENGLAND.

CLUTCH.

SPECIFICATION forming part of Letters Patent No. 627,876, dated June 27, 1899.

Application filed February 20, 1899. Serial No. 706,228. (No model.)

*To all whom it may concern:*

Be it known that I, JAMES PRICE, watchmaker, a subject of the Queen of Great Britain, residing at 95 High street, Maidstone, England, have invented certain new and useful Improvements in Clutches, of which the following is a specification, reference being had to the accompanying drawings, in which—

Figure 1:
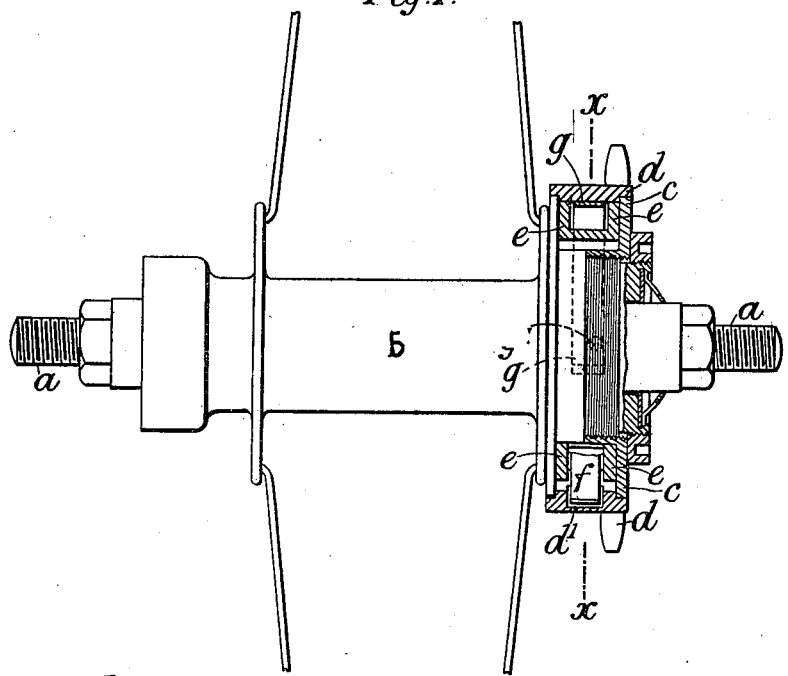
Figure 2:
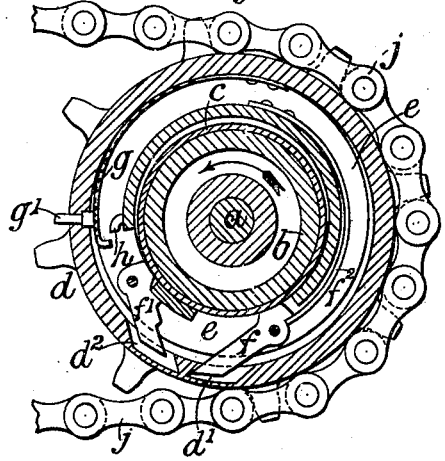
Figure 3:
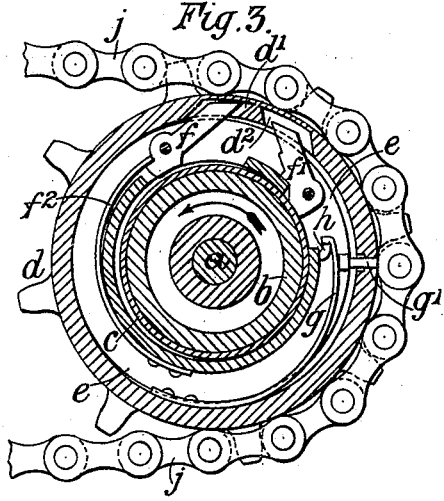

Figure 1 is a side elevation, partly in longitudinal central section, showing the axle and hub of a velocipede driving-wheel having my improved clutch applied thereto. Fig. 2 is a transverse section on the line $x\,x$, Fig. 1, showing the parts in the positions which they occupy when the velocipede is at rest; and Fig. 3 is a similar view showing the parts in another position, as hereinafter set forth.

My invention relates to clutches for driving-gear, and more particularly to that kind or class of clutches which are designed to permit the driving-wheel of a bicycle or other velocipede to run free while the pedals are held stationary by the rider's feet, while permitting the rider at any time to impart forward motion to said driving-wheel.

My invention consists, partly, in a clutch for operatively connecting two concentric rotary bodies, comprising a ring located between said rotary bodies, clutch-levers carried by said ring, and shoulders or abutments on one of said rotary bodies located between said clutch-levers, whereby, according to the direction of motion of this rotary body, one or other of said clutch-levers is forced against the other rotary body for the purpose hereinafter explained.

My said invention also partly consists in a clutch for operatively connecting two concentric rotary bodies, comprising a ring located between said rotary bodies, clutch-levers carried by said ring, and shoulders or abutments on one of said rotary bodies located between said clutch-levers, whereby, according to the direction of motion of this rotary body, one or other of said clutch-levers is forced against the other rotary body, and means to temporarily prevent operative connection between said rotary bodies, so that one can be held stationary, while the other is left free to rotate, for the purposes hereinafter explained.

My said invention also partly consists in the combination of two concentric rotary bodies, a ring between the same, two clutch-levers carried by said ring and inclined in opposite directions, shoulders or abutments on the outer concentric body adapted to engage with said clutch-levers, respectively, whereby when said outer concentric body is rotated in one or the other direction it will force one or the other of said clutch-levers against the inner concentric body, and means to hold one of said clutch-levers out of engagement with said inner concentric body, while the outer one is held stationary, and thus permit independent rotation of the inner one and allow it to run free.

My said invention also partly consists in the combination, with a chain-wheel and a driving-wheel having a hub extending into and concentric with said chain-wheel, of a ring between said hub and chain-wheel, clutch-levers pivoted to said ring and inclined in opposite directions, said chain-wheel having shoulders or abutments to engage with said clutch-levers, respectively, and force them against said hub, a driving-chain, and means actuated by said driving-chain to hold one of said clutch-levers out of engagement with said hub when the chain and chain-wheel are held stationary, and thus permit independent rotation of said driving-wheel; and my said invention further consists in other combinations of parts hereinafter described, and pointed out in the claims.

Referring to the drawings, in which my improvements are shown as applied to the driving-wheel of a bicycle, $a$ is the axle, which is fixed in the frame of the machine in the usual or any suitable manner.

$b$ is the hub of the driving-wheel, on one end of which is screwed a flanged ring $c$.

$d$ is the chain-wheel or sprocket-wheel, which is free to turn about the said hub $b$, except when operatively connected therewith by the clutch-levers hereinafter described.

$e$ is a loose ring or annular piece arranged between the chain-wheel $d$ and the hub $b$, which hub extends into and is concentric with said chain-wheel. $f\,f'$ are two clutch-levers pivoted to said ring $e$ and inclined in opposite directions. These clutch-levers extend, respectively, into slots $d'\,d^2$ in the chain-wheel $d$, so that when the said chain-wheel is turned in one or the other direction the shoulder or abutment at one end of one or other of the slots $d'$ $d^2$ will press against the corresponding clutch-lever $f$ or $f'$ and by turning it about its pivot force its inner end against the periphery of the hub $b$ or of the ring $c$, screwed thereon. The chain-wheel $d$ will thus be operatively connected with the hub $b$ for front pedaling or for back pedaling, as the case may be, the clutch-lever $f$ forming the connection for front pedaling and the clutch-lever $f'$ for back pedaling. A spring $f^2$ is fixed to the ring $e$ and bears against a shoulder on the short arm of the clutch-lever $f$, so that it always tends to press the said lever against the hub $b$ or the ring $c$ thereon.

In order to permit free and independent rotation of the driving-wheel of the bicycle when the pedals are held stationary, as for coasting, I provide suitable means for temporarily holding one of the said clutch-levers out of contact with the hub, or, in other words, for temporarily holding the loose ring $e$ in such a manner that it cannot be carried around with the hub $b$, so as to cause the clutch-lever $f'$ to operatively connect the said hub with the chain-wheel $d$. In the arrangement shown I use for this purpose a spring-catch $g$, attached to the chain-wheel $d$ and adapted to engage with a pin $h$ in the ring $e$. This catch is adapted to be moved into engagement with the said pin $h$ by the driving-chain $j$ acting through a sliding pin or rod $g'$ in the chain-wheel $d$ and to be held in engagement therewith so long as the said driving-chain and chain-wheel remain stationary with the chain pressing against the said pin or rod $g'$.

When front pedaling, the end of the spring-catch $g$ (carried by the sprocket-wheel $d$) will be separated from the pin $h$ (on the loose ring $e$) to about the extent shown in Fig. 2. If it is desired to coast, the rider will commence back pedaling and attempt to hold the pedals stationary. By this action the strain on the driving-chain $j$ will be reversed in direction, and consequently the sprocket-wheel $d$ will be turned in such direction as to carry the end of the spring-catch $g$ toward the pin $h$. If the pin $g'$ is at this time under the chain, so that it will be pressed inward by the chain $j$, thereupon the spring-catch $g$ is caused to snap over the curved pin or projection $h$ of the loose ring $e$, thus rendering the clutch-lever $f'$ temporarily inoperative and holding the ring $e$ in such manner that it cannot be carried around with the hub $b$ of the driving-wheel. Coasting can only take place when the pin $g'$ is engaged by the driving-chain $j$; but when this occurs the spring $g$ snaps into engagement with the curved pin $h$, and the clutch-levers $f$ $f'$ being thus relieved from pressure and thereby made temporarily inoperative, as shown in Fig. 3, the rider will now have no difficulty in holding the pedals, chain $j$, and sprocket-wheel $d$ stationary while the now unclutched driving-wheel runs free. Thus coasting may continue so long as the pedals are held stationary to maintain the pin $g'$ and chain $j$ in engagement with each other.

In front pedaling from the position shown in Fig. 3 the chain $j$ moves in the direction indicated by the arrow in Fig. 2. As soon as the pin or rod $g'$ is moved away from the chain the catch $g$ springs outward and the chain-wheel $d$ is caused to press the clutch-lever $f$ against the hub $b$, and thus operatively connect these parts. On the other hand, if it should be desired to back-pedal from the position shown in Fig. 3 the backward rotation of the sprocket-wheel $d$ will cause a similar movement of the loose ring $e$ through the engagement of the catch $g$ and pin $h$, the said loose ring $e$ turning freely on the hub $b$ of the driving-wheel, as the clutch-lever $f'$ is still inoperative; but as soon as the pin or rod $g'$ is thus moved away from the chain $j$ the catch $g$ will spring outward away from the pin $h$ of the ring $e$, and the continued strain on the chain $j$ will cause the abutment between the slots $d'$ $d^2$ of the sprocket-wheel $d$ to press the clutch-lever $f'$, Fig. 3, against the wheel-hub $b$, and thus operatively connect said hub and sprocket-wheel for continued back pedaling.

If desired, the shoulders or abutments for bringing the clutch-levers into action may be formed on an internal projection on the chain-wheel or outer rotary body.

The clutch-levers and other parts can also be somewhat modified in construction and arrangement without departing from my said invention.

What I claim is—

1. A clutch for operatively connecting two concentric rotary bodies, comprising a ring located between said rotary bodies, clutch-levers carried by said ring and shoulders or abutments on one of said rotary bodies located between said clutch-levers, whereby, according to the direction of motion of this rotary body, one or the other of said clutch-levers is forced against the other rotary body, for the purpose above specified.

2. A clutch for operatively connecting two concentric rotary bodies, comprising a ring located between said rotary bodies, clutch-levers carried by said ring and shoulders or abutments on one of said rotary bodies located between said clutch-levers, whereby, according to the direction of motion of this rotary body, one or other of said clutch-levers is forced against the other rotary body, and means to temporarily prevent operative connection between said rotary bodies so that one can be held stationary while the other is left free to rotate, for the purposes, above specified.

3. The combination of two concentric rotary bodies, a ring between the same, two clutch-levers carried by said ring, shoulders or abutments on the outer concentric body adapted to engage with said clutch-levers respectively, whereby, when said outer concentric body is rotated in one or the other direction, it will force one or the other of said clutch-levers against the inner concentric body, and means to temporarily prevent engagement of said clutch-levers with said inner concentric body while the outer one is held stationary and thus permit independent rotation of the inner one, for the purposes above specified.

4. The combination of two concentric rotary bodies, an inclined clutch-lever adapted to operatively connect the same when the outer one is rotated in one direction, a reversely-inclined clutch-lever adapted to connect said concentric bodies when the outer one is rotated in the reverse direction, a ring located between said rotary bodies and to which said clutch-levers are pivoted, and means to hold one of said clutch-levers out of engagement with the inner concentric body when the outer one is held stationary and thus permit independent rotation of the inner one, for the purposes above specified.

5. The combination, with a chain-wheel and a driving-wheel having a hub extending into and concentric with said chain-wheel, a ring between said hub and chain-wheel, clutch-levers pivoted to said ring and inclined in opposite directions, said chain-wheel having shoulders or abutments to engage with said clutch-levers respectively and force them against said hub, a driving-chain and means actuated by said driving-chain to hold one of said clutch-levers out of engagement with said hub when the chain and chain-wheel are held stationary, and thus permit independent rotation of said driving-wheel, substantially as hereinbefore described and for the purposes specified.

6. The combination of a chain-wheel, a driving-wheel the hub whereof extends into and is concentric with said chain-wheel, a ring between said hub and chain-wheel, clutch-levers pivoted to said ring, which are inclined in opposite directions and extend into slots in said chain-wheel respectively, and which are adapted to connect said chain-wheel to said hub, a spring tending to press one of said clutch-levers into engagement with said hub, a driving-chain and a spring-catch actuated by said driving-chain to hold one of said levers out of engagement with said hub when the driving-chain and chain-wheel are stationary, and thus permit independent rotation of said driving-wheel, substantially as hereinbefore described.

7. A clutch for operatively connecting two concentric rotary bodies, comprising a ring located between said rotary bodies, a clutch-lever carried by said ring and adapted to bear against one of said rotary bodies, a shoulder or abutment on the other of said rotary bodies for actuating said clutch-lever, and means to temporarily keep said shoulder or abutment out of engagement with said clutch-lever so that, while one of said bodies is rotating, the other can remain stationary, substantially as described.

In testimony whereof I have hereunto set my hand in presence of two subscribing witnesses.

JAMES PRICE.

Witnesses:
DAVID YOUNG,
CHARLES BEDINGFIELD.